United States Patent [19]

Jenkins

[11] 3,801,043

[45] Apr. 2, 1974

[54] COMPACT CASSETTE TAPE TRANSPORT WITH DIRECT CAPSTAN AND TORQUE MOTOR DRIVES

[75] Inventor: John P. Jenkins, Towanda, Ill.

[73] Assignee: International Tapetronics Corporation, Bloomington, Ill.

[22] Filed: Mar. 24, 1972

[21] Appl. No.: 237,707

[52] U.S. Cl. .................................. 242/199, 274/4 C

[51] Int. Cl.... G03b 1/04, G11b 15/32, G11b 23/04

[58] Field of Search ............................ 242/197–204; 274/4 C, 4 D, 11 C, 11 D

[56] References Cited

UNITED STATES PATENTS

| | | | |
|---|---|---|---|
| 2,911,162 | 11/1959 | Kyle, Jr. | 242/203 |
| 3,460,782 | 8/1969 | Findeisen | 242/198 |
| 3,408,016 | 10/1968 | Ganske et al. | 242/203 |
| 3,383,061 | 5/1968 | Thompson et al. | 242/200 |

*Primary Examiner*—Leonard D. Christian
*Attorney, Agent, or Firm*—Davis, McCaleb & Lucas

[57] ABSTRACT

Capstan, which engages the tape in a cassette, is directly mounted on the capstan motor shaft. Spindles which engage the reels in the cassette are directly mounted on the shafts of two separate torque motors, one or the other of which is energizable to wind tape on one reel and unwind it from the other. A U cross-section motor mounting frame has a forward upright wall in the front panel of the transport housing, and a rearward upright wall spaced behind it within the housing. The capstan motor is fastened to the back side of the rearward wall and has an elongated shaft extending through both walls and terminating in a capstan on the front side of the forward wall. The capstan motor has an elongated bearing supporting the shaft adjacent the capstan. The torque motors are fastened to the back side of the forward wall and have spindle shafts extending through that wall. The torque motors are disposed between the forward and rearward walls, alongside the capstan elongated shaft, forward of the capstan motor, and within the axial projection of the capstan motor.

7 Claims, 4 Drawing Figures

COMPACT CASSETTE TAPE TRANSPORT WITH DIRECT CAPSTAN AND TORQUE MOTOR DRIVES

CROSS REFERENCES TO RELATED APPLICATIONS

Reference is made to the following co-pending, related patent applications, assigned to the same assignee:

Jenkins Appln. Ser No. 237,762, filed Mar. 24, 1972 on Cassette Tape Transport With Pivotally Supported Universally Adjustable Head and Upright Front-Mounted Cassette Jenkins Appln. Ser. No. 341,769, Filed Mar. 15, 1973 on Tape Transport With Automatic Torque Motor Brake Jenkins Appln. Ser. No. 344,180, Filed Mar. 23, 1973 on Automatic Sequence Control for Reproducing Apparatus Jenkins Appln. Ser. No. 349,677, Filed Apr. 10, 1973 on Cassette Tape Transport With Universally Adjustable Head and Upright Front-Mounted Cassette

BACKGROUND OF THE INVENTION

This invention relates to tape recording and playback apparatus for a tape cartridge containing a magnetic tape with opposite ends wound on a pair of reels. The invention relates particularly to an improved tape transport for moving tape between reels in a standard cassette-type tape cartridge.

Audio recording and reproducing cassettes complying with standards of The National Association of Broadcasters are widely in use. These standards provide rigid specifications for the spacing and locations of the reel centers and the capstan-receiving apertures. These standard cassettes are quite small. For instance, the center line spacing between reels is only 1.68 inches and the spacing between the center lines of either capstan opening and the nearest reel is even less. Considering the physical dimensions of the capstan and reel torque motors required, and the diameter of an adequate flywheel mass on the capstan motor, it is not possible to arrange capstan and torque motors side by side on such small centers. Therefore, it has been conventional practice to laterally offset some or all of these motors, out of alignment with the reel driving spindles and the capstan, and to drive them through belts, friction wheels, or gears, and often with mechanical slip clutches. This makes the reproducer objectionably bulky. Furthermore, these complicated drives require a multiplicity of parts which increase cost, and are difficult to maintain in top working order. They are subject to misalignment with resulting erratic performance in a class of equipment where great precision is required. For instance, industry standards limit flutter and wow from all causes to less than one-fourth of one percent, but this is impossible to maintain over long periods with mechanical drives and clutches unless they have frequent service attention.

BRIEF SUMMARY OF THE INVENTION

A general object of the present invention is to provide a simple, reliable, inexpensive, direct drive mounting for the reel torque motors and capstan motor in a cassette recorder and reproducer.

Another object of the present invention is to provide a cassette recorder and reproducer in which the reels and the capstan are driven directly by separate motors.

Another object is to provide an unusually compact direct motor drive for such a recorder and reproducer.

An important feature of the present invention is that one of the motor means driving either the reel spindles or the capstan is offset in a direction away from the cassette mounting and aligning means, and the other motor means is positioned in the forward projection of said one motor means to provide a compact, direct driving arrangement which is simple, inexpensive, and highly reliable in that it completely eliminates all mechanical driving connections and clutches which are troublesome in conventional equipment.

BRIEF DESCRIPTION OF THE DRAWINGS

Further objects and advantages will be apparent from the following description taken in connection with the drawings in which.

Like parts are referred to by like reference characters throughout the figures of the drawings.

DETAILED DESCRIPTION OF THE PREFERRED EMBODIMENT

Figure 1:
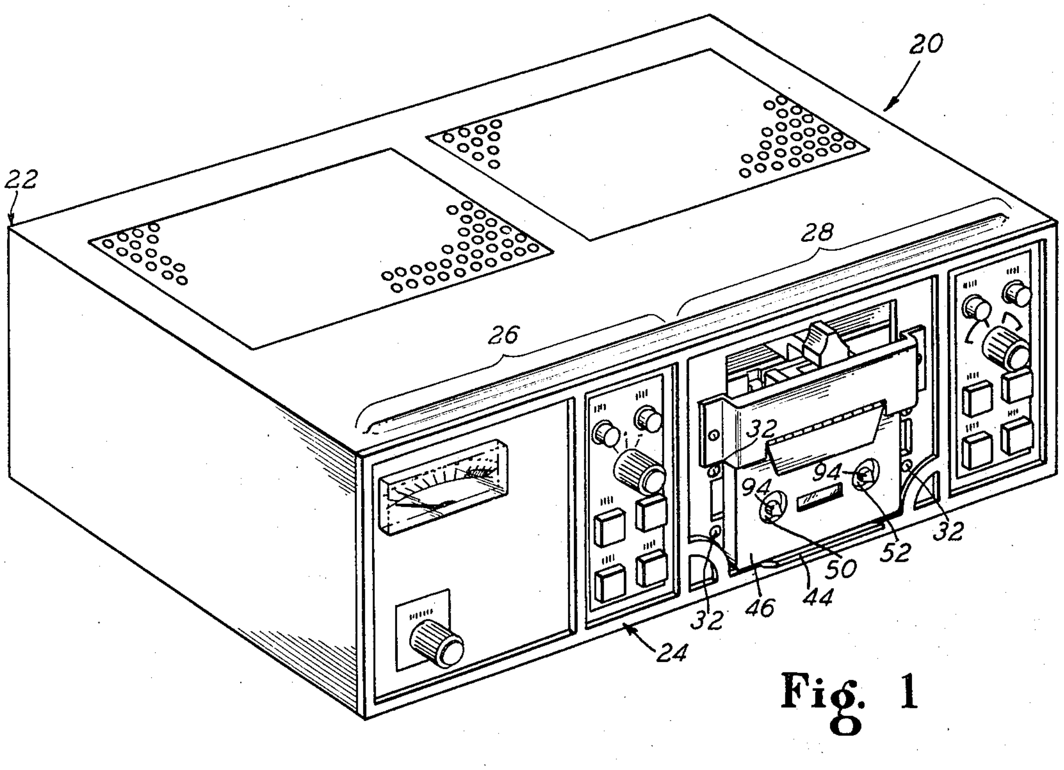
FIG. 1 is a perspective view of a recorder and reproducer employing a preferred form of the present invention.

A preferred embodiment of the invention as shown in the drawings will now be described.

A cassette recorder and reproducer 20 has a housing 22 with a front panel 24. There is a recording portion 26 and a reproducing portion 28. Only the reproducing portion 28 is of interest in connection with the present invention.

A cassette tape transport generally designated 29 includes a motor supporting frame 30 fastened just behind the front panel 24 by bolts 32.

Figure 3:
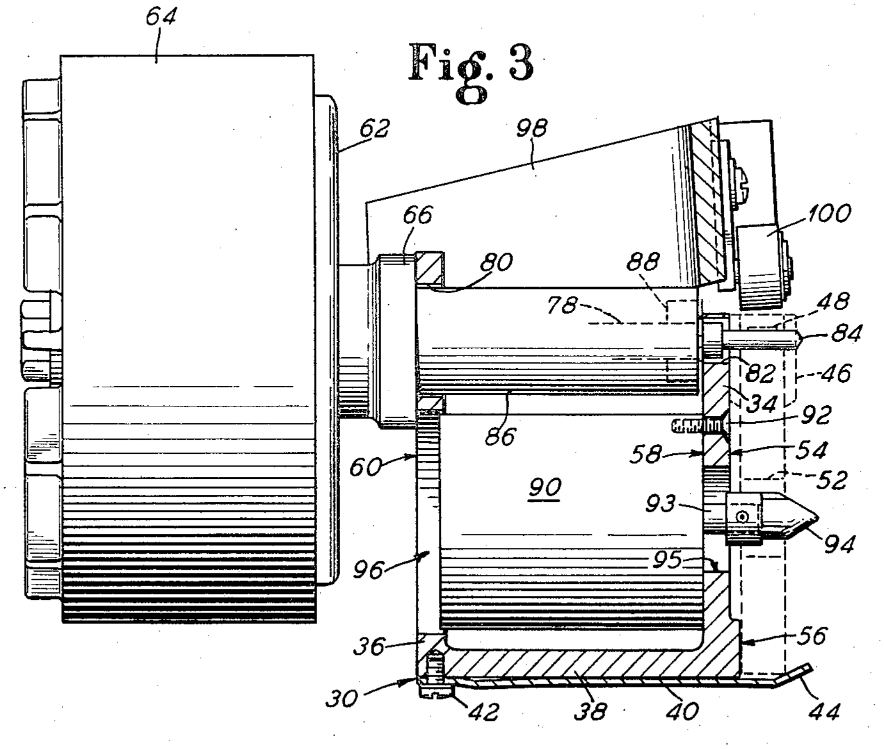
FIG. 3 is a vertical sectional view of FIG. 2, taken along the line 3—3.
Figure 4:
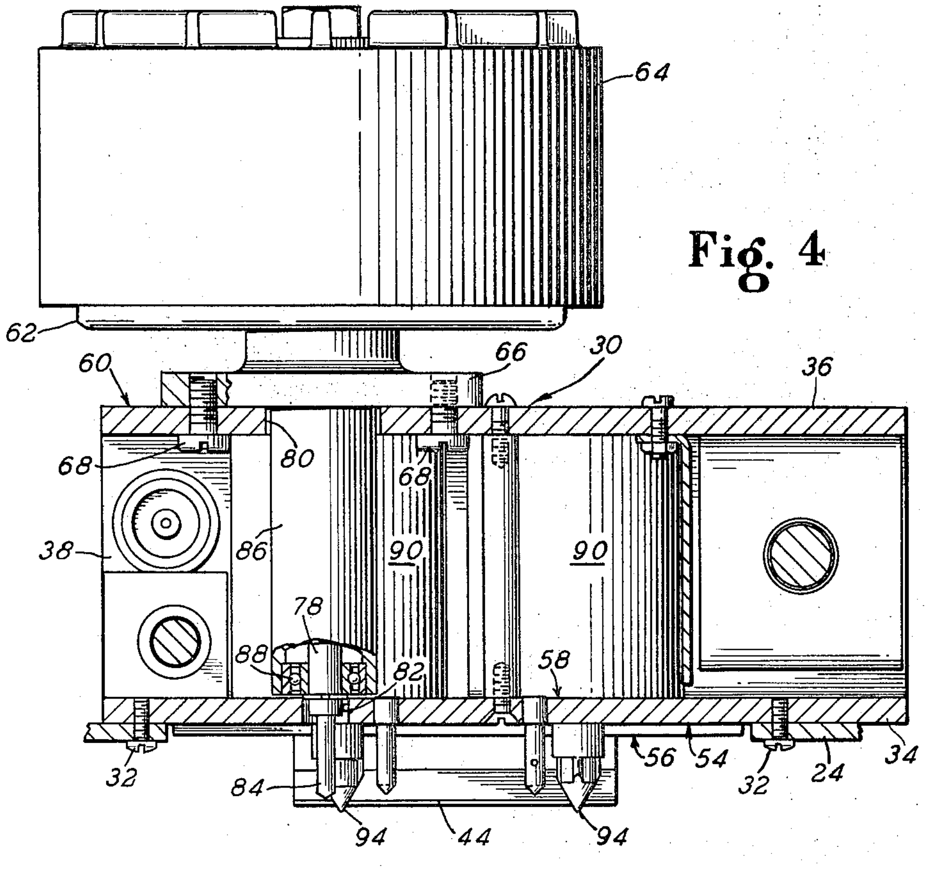
FIG. 4 is a horizontal sectional view of FIG. 2, taken along the line 4—4.

As best shown in FIG. 3, the motor supporting frame 30 is U-shaped in cross-section. It has an upright forward wall 34 (connected by the above-mentioned bolts 32 to the front panel), an upright rearward wall 36 spaced behind wall 34, and a bottom wall 38 rigidly interconnecting the forward and rearward walls.

A spring plate 40 is bolted underneath bottom wall 38 by bolts 42 and has a forward, upwardly inclined extension 44 forming a partial support for a standard National Association of Broadcasters cassette 46 having a tape 48 with its ends supported on reels 50 and 52.

An important feature of the present invention which makes possible the precise alignment of the driving motors with the cassette are first, second, and third mounting and aligning surfaces which are in spaced, parallel relation to one another and which will now be described.

The first mounting and aligning surface, due to the shape of the standard cassette, is discontinuous. It is on the front side of forward wall 34 and comprises separate surface portions 54 and 56, dimensioned to abut separate surface portions of a cassette 46 when upright as shown in FIG. 3.

The second mounting and aligning surface is designated 58 and is on the back side of forward wall 34.

The third mounting and aligning surface is designated 60 and is on the back side of the rearward wall 36.

A capstan motor 62 has a rotatable outer shell 64 providing a flywheel effect, and has a forward flange 66 fastened by bolts or screws 68 to the above-mentioned third mounting and aligning surface 60.

The capstan motor 62 has a forwardly elongated shaft 78 extending through an opening 80 in the rearward wall 36 and an opening 82 in the forward wall 34. It terminates in a capstan 84 which extends forwardly from the forward wall 34. A forwardly elongated bearing support 86 extends to a location just behind the forward wall 34 and has a forward bearing 88 rotatably journaling the shaft 78 adjacent the capstan. This provides the best guidance for the capstan and eliminates shaft run-out which could cause flutter and wow.

A pair of reel torque motors 90, 90 (which may be and are here shown as identical) are disposed between the forward and rearward walls 34 and 36 ahead of the capstan motor. These torque motors are fastened as by screws or bolts 92 to the above-described second mounting and alignment surface 58 on the back side of forward wall 34. Each torque motor 90 has a shaft 93 (FIG. 3) extending through an opening 95 in wall 34 and terminating in a reel-engageable spindle 94.

Figure 2:
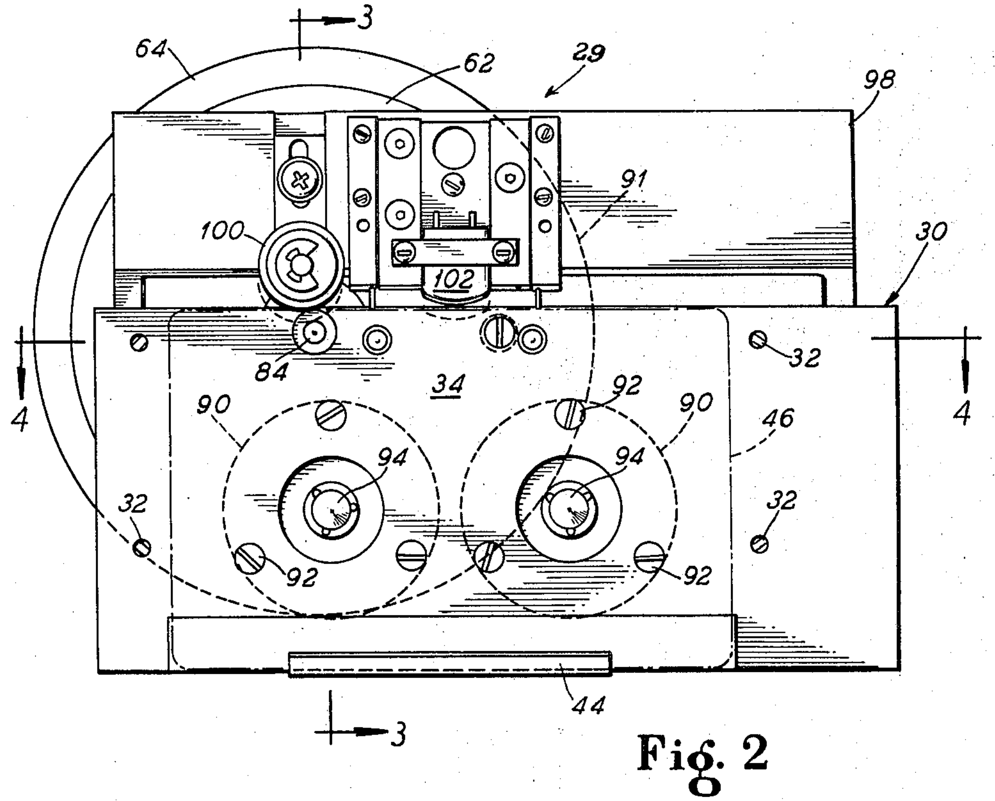
FIG. 2 is a fragmentary front view of FIG. 1 with portions stripped away to show the two reel torque motors one disposed wholly and the other partly within a forward, axial projection of the capstan motor in accordance with the present invention.

By mounting the capstan motor 62 behind the rearward wall 36, and thereby offsetting it rearwardly from the torque motors 90, the latter may be mounted within a forward, axial projection of the capstan motor. This is best shown in FIG. 2 where the left-hand torque motor 90 is shown wholly within the circular projection 91 of the capstan motor 62, and the right-hand motor 90 is shown substantially within it.

The rearward wall 36 has a pair of circular openings 96. These facilitate insertion and assembly of the motors 90 before the capstan motor is assembled.

The first, second and third mounting and aligning surfaces 54/56, 58 and 60 will be machined or otherwise made precisely parallel. In the embodiment shown, these are all vertical surfaces. This makes the capstan and torque motor shafts 78 and 93, 93 precisely horizontal and at right angles to the cassette 46 when held against surfaces 54, 56 by the spring plate 40 and conventional locating pins (not shown).

Assembly and disassembly are simple and can be carried out quickly. The capstan motor 62 is removed by loosening screws 68; and both torque motors 90 are removed by loosening screws 92.

In operation, the cassette 46 will be inserted as shown in FIGS. 1 and 3, with the tape 48 passing just across the top of the capstan 84. To run the tape in one direction or the other, under the head 102, one or the other of the torque motors 90 will be energized to wind tape on the driven reel, in the usual manner. To record or reproduce, a support 98 will be activated (by means not shown) to move the pinch roller 100 and head 102 down against the tape in the usual way.

Certain of the elements shown in the drawings, but not described or claimed in this application are described in the above-mentioned co-pending application to which reference should be made for more detailed descriptions of those features.

While one form in which the present invention may be embodied has been shown and described, it will be understood that various modifications may be made within the spirit and the scope of the invention which should be limited only by the appended claims. For instance, although the present disclosure illustrates the torque motors disposed forwardly within an axial projection of the capstan motor, it will be obvious that the reverse may be a useful arrangement where the size of the capstan motor is relatively small compared to the torque motors.

I claim:

1. In a cassette tape transport having a housing with a control panel, a compact mounting for a direct drive capstan motor and direct drive torque motors comprising:

a motor supporting frame mounted in said housing on said control panel having external cassette mounting and aligning means to hold a cassette in operating position;

a capstan motor in said housing mounted on said supporting frame and having an elongated shaft with a capstan engageable with tape in a cassette when in said operating position; and a pair of torque motors in said housing mounted on said supporting frame alongside said elongated shaft, disposed between said capstan motor and said cassette mounting and aligning means in space comprising an axial projection of said capstan motor toward said cassette mounting and aligning means, said torque motors having shafts with spindls directly engageable with reels in cassette when in said operating position.

2. In a cassette tape transport having a housing with a control panel, a compact mounting for a direct drive capstan motor and direct drive torque motors comprising:

a motor supporting frame having an upright forward wall associated with said control panel and an upright rearward wall spaced from and parallel to said forward wall;

cassette mounting and aligning means on the front side of said forward wall to hold a cassette in operating position;

a capstan motor in said housing mounted on the back side of said rearward wall and having an elongated shaft extending through both of said walls and having a capstan engageable with tape in a cassette when in said operating position; and a pair of torque motors in said housing mounted on the back side of said forward wall, disposed between said walls alongside said elongated shaft in space comprising a longitudinal projection of said capstan motor, said torque motors having shafts extending through said forward wall and spindles engageable with reels in a cassette when in said operating position.

3. In a cassette tape transport having a housing with a control panel, a compact mounting for a direct drive capstan motor means and a direct drive torque motor means comprising:

a motor supporting frame having a pair of spaced parallel walls one of which is associated with said panel and is adapted to support a cassette in operating position on the outside thereof, the other of said walls being inside said housing in fixed spaced parallel relation with said one wall;

one of said motor means being mounted on the back side of said other wall and having shaft means extending through both of said walls into operating relation with a cassette in said operating position;

the other of said motor means being mounted on the back side of said one wall and having shaft means extending therethrough into operative relation with a cassette in said operating position; and said other motor means being disposed between said walls alongside the shaft means of said one motor means in space comprising a longitudinal projection of said one motor means.

4. In a cassette tape transport having a housing with a front panel, a compact mounting for a direct drive capstan motor and a pair of direct drive torque motors comprising:

a motor supporting frame having a forward wall associated with said front panel and a rearward wall spaced from said forward wall, and means rigidly interconnecting said walls;

said motor supporting frame having first, second and third mounting surface means in spaced parallel relation to one another;

said first mounting surface means being on the front side of said forward wall and adapted to support and align a cassette in operating position, said second and third mounting surface means being on the rear sides of said forward and rearward walls respectively;

said capstan motor being mounted on said third surface means and having a forwardly elongated rotating capstan shaft extending through said rearward and forward walls and terminating in a capstan extending forwardly from said forward wall to engage tape in a cassette in said operating position; and said torque motors being disposed between said forward and rearward walls alongside said forwardly elongated shaft in space comprising a forward projection of said capstan motor, said torque motors being mounted on said second surface means and having shafts extending forwardly through said forward wall and terminating in spindles extending forwardly from said forward wall to engage reels in a cassette in said operating position.

5. In a cassette tape transport, a compact mounting for a direct drive capstan motor and a pair of direct drive torque motors, the combination of claim 4 in which:

said capstan motor has a forward mounting surface assembled in abutment with said third mounting surface means by fastening elements acting between said rearward wall and said capstan motor; and said torque motors having forward mounting surfaces assembled in abutment with said second mounting surface means by fastening elements acting between said forward wall and said torque motors.

6. In a cassette tape transport, a compact mounting for a direct drive capstan motor and a pair of direct drive torque motors, the combination of claim 4 in which:

said capstan motor has an axial bearing support member enclosing said forwardly elongated shaft and extending through said rearward wall to said forward wall and having a forward bearing rotatably journaling said forwardly elongated shaft adjacent said capstan.

7. In a cassette tape transport having a housing with a front panel, a direct drive mounting for a capstan motor and a pair of torque motors comprising:

a rigid U cross-section motor supporting frame having an upright forward wall associated with said front panel, an upright rearward wall spaced behind said forward wall, and a bottom wall rigidly interconnecting said forward and rearward walls;

said motor supporting frame having first, second and third surfaces in spaced parallel relation to one another;

said first surface being on the front side of said forward wall and adapted to support and align a cassette in operating position; said second and third surfaces being on the rear sides of said forward and rearward walls respectively;

said capstan motor being mounted on said third surface and having a forwardly elongated shaft extending through said rearward and forward walls and terminating in a capstan extending forwardly from said first surface to engage tape in a cassette in said operating position; and said torque motors being disposed between said forward and rearward walls alongside said elongated shaft forwardly of said capstan motor, said torque motors being mounted on said second surface and having shafts extending forwardly through said forward wall and terminating in spindles extending forwardly from said first surface to engage reels in a cassette in said operating position.

* * * * *